(12) United States Patent
Whitaker et al.

(10) Patent No.: US 7,430,860 B2
(45) Date of Patent: Oct. 7, 2008

(54) HYDROSTATIC TRANSMISSION CIRCUIT

(75) Inventors: James Whitaker, Greeneville, TN (US); Xingen Dong, Greeneville, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 11/237,144

(22) Filed: Sep. 28, 2005

(65) Prior Publication Data

US 2006/0064974 A1    Mar. 30, 2006

Related U.S. Application Data

(60) Provisional application No. 60/613,889, filed on Sep. 28, 2004.

(51) Int. Cl.
 *F16D 31/02* (2006.01)
(52) U.S. Cl. .......................... 60/464; 60/488
(58) Field of Classification Search ............... 60/464, 60/468, 494, 488
 See application file for complete search history.

(56) References Cited

U.S. PATENT DOCUMENTS

| | | | |
|---|---|---|---|
| 2,961,829 A | 10/1960 | Weisenbach | |
| 3,236,049 A | 2/1966 | Reinke | |
| 3,734,225 A | 5/1973 | Kobald et al. | |
| 5,211,015 A | 5/1993 | Schroeder | |
| 6,263,670 B1 | 7/2001 | Gluck et al. | |
| 6,837,047 B2 | 1/2005 | Dong et al. | |
| 2004/0006981 A1* | 1/2004 | Dong et al. | 60/464 |

* cited by examiner

*Primary Examiner*—Michael Leslie
(74) *Attorney, Agent, or Firm*—Robert J. Clark; Daniel J. Whitman; Joseph J. Pophal (57) ABSTRACT

Improvement in a hydrostatic valve assembly for use in a hydrostatic transmission, for controlling fluid transfer between a first, second and third line, wherein two of the lines define first and second pressure lines within a closed loop circuit. The valve assembly comprises a valve body having ports in communication with the three lines; a spool bore and valve spool reciprocating therewithin, having first and second end portions joined by a connecting portion, and first and second bypass orifices within the valve spool; and dampers for centering the valve spool in a neutral position. The bypass orifices utilize increased cross-sectional areas that permit the passage of substantially the full flow of the charge pump, without using a charge pump relief valve, at a low pressure drop. A hydraulic system utilizing this valve assembly and a method for increasing the transmission efficiency, in the neutral mode, are also set forth.

4 Claims, 5 Drawing Sheets

HYDROSTATIC TRANSMISSION CIRCUIT

CROSS REFERENCE TO RELATED APPLICATIONS

This is a non-provisional patent application claiming the benefit of the filing date of U.S. Provisional Application No. 60/613,889, filed Sep. 28, 2004, the disclosure of which is incorporated herein by reference.

BACKGROUND OF THE INVENTION

1. Technical Field

The present invention pertains to a valve assembly and method for increasing efficiency thereof, in the neutral mode of operation, without impairing the performance in non-neutral operating modes. The present invention further relates to a hydraulic system that includes the noted valve assembly and an improved method of operation. Specifically, a separate charge pump relief valve is eliminated and the valve bypass orifices utilize increased cross-sectional areas to permit the passage of substantially the full flow of the charge pump at a low restriction to flow through these orifices.

2. Description of the Related Art Including Information Disclosed Under 37 CFR 1.97 and 1.98

Hydrostatic transmissions have many uses, including the propelling of vehicles, such as grass mowing machines, and offer a stepless control of the machine's speed. A typical hydrostatic transmission system includes a variable displacement main pump coupled in a closed hydraulic circuit with a fixed displacement hydraulic motor. For most applications, the main pump is driven by a prime mover, at a predetermined speed, in a given direction. Changing the displacement of the main pump will change its output flow rate, which controls the speed of the coupled motor. Main pump outflow can be reversed, thus reversing the directional rotation of the motor. In a vehicle, the motor is connected directly, or via suitable gearing, to the vehicle's wheels or tracks. Both acceleration and deceleration of the transmission are controlled by varying the displacement of the main pump from its neutral position. A charge pump is added to the hydraulic circuit in order to charge the closed circuit with hydraulic fluid, through check valves, thus making up for possible lost fluid due to internal leakage. Additional valves, such as high pressure relief valves, bypass valves and hot oil shuttle valves, for example, are also often utilized, in a manner well known in the art. The present invention relates specifically to the hydraulic main pump and motor combination having improved integrated valves for providing smoother operation, particularly during the acceleration phase of the transmission, near its neutral position.

In hydrostatic transmission applications, an over-center variable displacement main pump is normally utilized, with a control handle enabling the operator to control the direction and amount of flow from the main pump. By pushing the handle in one direction, the main pump delivers flow in one direction of motor operation. By pulling the handle in the opposite direction, the main pump delivers flow for the opposite direction. In order to avoid a rough, jerky start of the motor, the prior art has utilized an orifice with a fixed diameter that is added to the closed-loop circuit to increase the width of the dead band of the hydrostatic transmission. The dead band of a hydrostatic transmission refers to the non-response range of the transmission, near its neutral position, where the motor will not turn over due to internal cross-port leakage across the bypass orifice.

Prior art U.S. Pat. No. 6,837,047 B2, also assigned to the assignee of the present invention, and which will be more fully discussed in the "Detailed Description of the Invention", sets forth a hydraulic valve assembly, as well as a hydraulic system that utilizes this valve assembly, together with a method for increasing the width of the transmission dead band, wherein the bypass orifices are enabled in the neutral position, but are substantially disabled in non-neutral positions. While this has improved transmission performance, the present invention represents an improvement over these prior art constructions by eliminating the previously-required prior art charge pump relief valve and modifying the hot oil shuttle valve by increasing the sizes of the bypass orifices so as to allow the passage of substantially the full flow of the charge pump, at a low pressure drop, i.e., at a low restriction to flow through these bypass orifices, thus resulting in a less costly and more efficient hydrostatic transmission that also operates at a lower working temperature.

The patent literature sets forth a large number of hydrostatic transmission pump/motor systems, including, for example: U.S. Pat. No. 2,961,829 to Weisenbach; U.S. Pat. No. U.S. Pat. No. 3,326,049 to Reinke; U.S. Pat. No. 3,734,225 to Kobald et al.; U.S. Pat. No. 5,211,015 to Schroeder, and U.S. Pat. No. 6,263,670 B1 to Gluck et al. However, none of these prior art structures pertains to the specific structure, system, and method of operation of the present invention.

BRIEF SUMMARY OF THE INVENTION

Accordingly, in order to overcome the deficiencies of the prior art devices and methods, the present invention provides an improved hydraulic valve assembly that eliminates the previously-required charge pump relief valve and utilizes a modified hot oil shuttle valve, having increased cross-sectional area bypass orifices that allow the passage of substantially the full flow of the charge pump, at low pressure drop, i.e., at a low restriction to flow through these orifices. This results in a less costly and more efficient hydrostatic transmission that also operates at a lower working temperature.

Specifically, in terms of structure, a feature of the present invention is to provide a hydraulic system for use with a hydrostatic transmission, comprising in combination: a variable displacement main pump; a hydraulic motor; a closed loop hydraulic circuit, including low and high pressure leg portions, operatively interconnecting the main pump and motor; a charge pump, within the circuit, having an outlet line only to the circuit; a valve block within the circuit, for controlling fluid transfer between a first, second and third line, within the hydraulic circuit, wherein two of the first, second and third lines define first and second pressure lines and are located at substantially similar longitudinal distances from the remaining one of the first, second and third lines, the remaining line being rotationally displaced relative to the first and second pressure lines, the valve block comprising:

i. a valve body defining a first port for connection to the remaining line, a second port for connection to one of the first and second pressure lines, and a third port for connection to the other of the first and second pressure lines, the valve body further including a spool bore in fluid communication with the first, second and third lines;

ii. a valve spool adapted for sealing reciprocation within the spool bore, having a first end portion, a second end portion, a connecting portion having a cross-sectional area smaller than the cross-sectional areas of the first and second end portions, a first bypass orifice within the valve spool extending between the first end portion and the connecting portion, and a second bypass orifice within the valve spool extending between the second end portion and the connecting portion, the valve spool being movable from a neutral position, in which the valve spool is longitudinally centered within the spool bore and where the pressure forces in the first and second pressure lines are substantially similar, to a first position, occurring when the pressure forces in the first pressure line are greater than the pressure forces in the second pressure line, or to a second position, occurring when the pressure forces within the first pressure line are less than the pressure forces in the second pressure line, with the connecting portion being in fluid communication with at least a portion of the first port at each of the positions of the valve spool, wherein: while in the neutral valve spool position, the first bypass orifice is aligned with the first pressure line for fluid communication with the remaining line and the second bypass orifice is aligned with the second pressure line for fluid communication with the remaining line; while in the first valve spool position, the first and second bypass orifices are at least substantially disabled and the connecting portion is in fluid communication with one of the first and second pressure lines; while in the second valve spool position, the first and second bypass orifices are at least substantially disabled and the connecting portion is in fluid communication with the other of the first and second pressure lines;

iii. dampers located at both ends of the valve spool, for centering the valve spool, relative to the remaining line, in the neutral valve position; and iv. wherein the bypass orifice cross-sectional areas are of a size to allow the passage of substantially the full flow of the charge pump at a low restriction to flow through the bypass orifices; and one of a relief orifice and a low pressure forward/reverse charge pressure relief valve interconnected with the valve block and the hydraulic circuit low pressure leg portion, the bypass orifices exposing both of the hydraulic circuit low and high pressure leg portions to the one of a relief orifice and relief valve when the main pump is substantially centered to stop rotation of the hydraulic motor.

In one version thereof, the one of the relief orifice and relief valve is a relief orifice, while in another version thereof, the one of the relief orifice and the relief valve is a relief valve.

In a further version, the only fluid that needs to be passed through the bypass orifices is the fluid that is produced as a result of any undesired slight inclination of the angle of an internal swashplate of the main pump, when the main pump is placed in the neutral position by an operator.

In a differing version, the first and second bypass orifices have a cross-sectional area sufficient to permit equalization of the fluid pressure between the hydraulic circuit low and high pressure leg portions. In one application, the valve block functions as a hot oil shuttle valve.

A further embodiment of this invention pertains to a hydraulic valve assembly for use in a hydrostatic transmission, the transmission including a variable displacement main pump, an interconnected charge pump, an interconnected hydraulic motor, and an interconnecting closed loop hydraulic circuit having low and high pressure leg portions, the hydraulic valve assembly controlling fluid transfer between a first, a second and a third line, within the hydraulic circuit, wherein two of the first, second and third lines define first and second pressure lines and are located at substantially similar longitudinal distances from the remaining one of the first, second and third lines, the remaining line being rotationally displaced relative to the first and second pressure lines, the valve assembly comprising in combination: a valve body defining a first port for connection to the remaining line, a second port for connection to one of the first and second pressure lines, and a third port for connection to the other of the first and second pressure lines, the valve body further including a spool bore in fluid communication with the first, second and third lines; a valve spool adapted for sealing reciprocation within the spool bore, having a first end portion, a second end portion, a connecting portion having a cross-sectional area smaller than the cross-sectional area of the first and second end portions, a first bypass orifice within the valve spool extending between the first end portion and the connecting portion, and a second bypass orifice within the valve spool extending between the second end portion and the connecting portion, the valve spool being movable from a neutral position, in which the valve spool is longitudinally centered within the spool bore and where the pressure forces in the first and second pressure lines are substantially similar, to a first position, occurring when the pressure forces in the first pressure line are greater than the pressure forces in the second pressure line, or to a second position, occurring when the pressure forces in the first pressure line are less than the pressure forces in the second pressure line, with the connecting portion being in fluid communication with at least a portion of the first port at each of the positions of the valve spool, wherein: while in the neutral valve spool position, the first bypass orifice is aligned with the first pressure line for fluid communication with the remaining line and the second bypass orifice is aligned with the second pressure line for communication with the remaining line; while in the first valve spool position, the first and second bypass orifices are at least substantially disabled and the connecting portion is in fluid communication with one of the first and second pressure lines; while in the second valve spool position, the first and second bypass orifices are at least substantially disabled and the connecting portion is in fluid communication with the other of the first and second pressure lines; dampers, located at both ends of the valve spool, for centering the valve spool, relative to the remaining line, in the neutral valve position; and wherein the first and second bypass orifices have a cross-sectional area sufficient to permit the equalization of the fluid pressure between the hydraulic circuit low and high pressure leg portions.

In a variation thereof, the only fluid that needs to be passed through the bypass orifices is the fluid that is produced as a result of any undesired slight inclination of the angle of an internal swashplate of the main pump, when the main pump is placed in the neutral position by an operator.

In a differing variation, the bypass orifice cross-sectional areas are of a size to allow the passage of substantially the full flow of the charge pump at a low restriction to flow through the bypass orifices. In one version, the only fluid that needs to be passed through the bypass orifices is the fluid that is produced as a result of any undesired slight inclination of the angle of an internal swashplate of the main pump, when the main pump is placed in the neutral position by an operator. The valve assembly can function as a hot oil shuttle valve.

Another feature of the present invention includes a method for increasing the efficiency of a hydrostatic transmission, in a neutral mode of operation, without impairing the performance in non-neutral modes of operation, wherein the hydrostatic transmission includes: a variable displacement main pump; a hydraulic motor; a closed loop hydraulic circuit operatively interconnecting the main pump and motor; a charge pump having an outlet line operatively interconnected only to the circuit; a valve block within the circuit, for controlling fluid transfer between a first, second and third line, within the hydraulic circuit, wherein two of the first, second and third lines define first and second pressure lines, the remaining line defining an outlet line; the valve block comprising a valve body defining a first port for connection to the remaining line, a second port for connection to one of the first and second pressure lines, and a third line for connection to the other of the first and second pressure lines, the valve body further including a spool bore in communication with the first, second and third lines; a valve spool adapted for sealing reciprocation within the spool bore, having a first end portion, a second end portion and a connecting portion having a cross-sectional area smaller than the cross-sectional areas of the first and second end portions; and dampers for centering the valve spool in a neutral mode of operation, the method comprising: a. including a first bypass orifice, within the valve spool, extending between the first end portion and the connecting portion; b. also including a second bypass orifice, within the valve spool, extending between the second end portion and the connecting portion; c. sizing the cross-sectional areas of the first and second bypass orifices to allow the passage of substantially the full flow of the charge pump, at a low restriction to flow, through the bypass orifices; d. keeping the connecting portion in fluid communication with the first port at all times; e. permitting substantially equal fluid flows from the second and third ports, via the first and second bypass orifices, respectively, to the first port, in the neutral mode of operation when fluid forces acting on the first and second end portions are about equal; and f. shifting the valve spool from the neutral mode of operation to non-neutral modes of operation during which the fluid forces acting on the first and second end portions are unequal, to thereby at least substantially disable the fluid flows via the first and second bypass orifices while simultaneously permitting fluid flows from one of the pressure lines to the outlet port.

The noted method also includes that the only fluid passing through the bypass orifices is the fluid that is produced as a result of any undesired slight inclination of the angle of an internal swashplate of the main pump, when the main pump is placed in the neutral position by an operator.

The noted method further includes that the recited sizing step alternatively includes keeping the cross-sectional areas of the first and second bypass orifices of a sufficient size to permit equalization of the fluid pressure between the hydraulic circuit low and high pressure leg portions.

Finally, the noted method includes that the recited sizing step alternatively includes keeping the cross-sectional areas of the first and second bypass orifices of a sufficient size to allow the passage of substantially the full flow of the charge pump at a low restriction through the orifices.

BRIEF DESCRIPTION OF THE SEVERAL
VIEWS OF THE DRAWINGS

FIG. 5a is a view, similar to that of FIG. 5, but showing the shuttle valve when the fluid pressure in line 23a is greater than the fluid pressure in line 24a; and FIG. 5b is a view, similar to that of FIG. 5, but showing the position of the shuttle valve when the fluid pressure in line 24a is greater than the fluid pressure in line 23a.

DETAILED DESCRIPTION OF THE INVENTION

Figure 1:
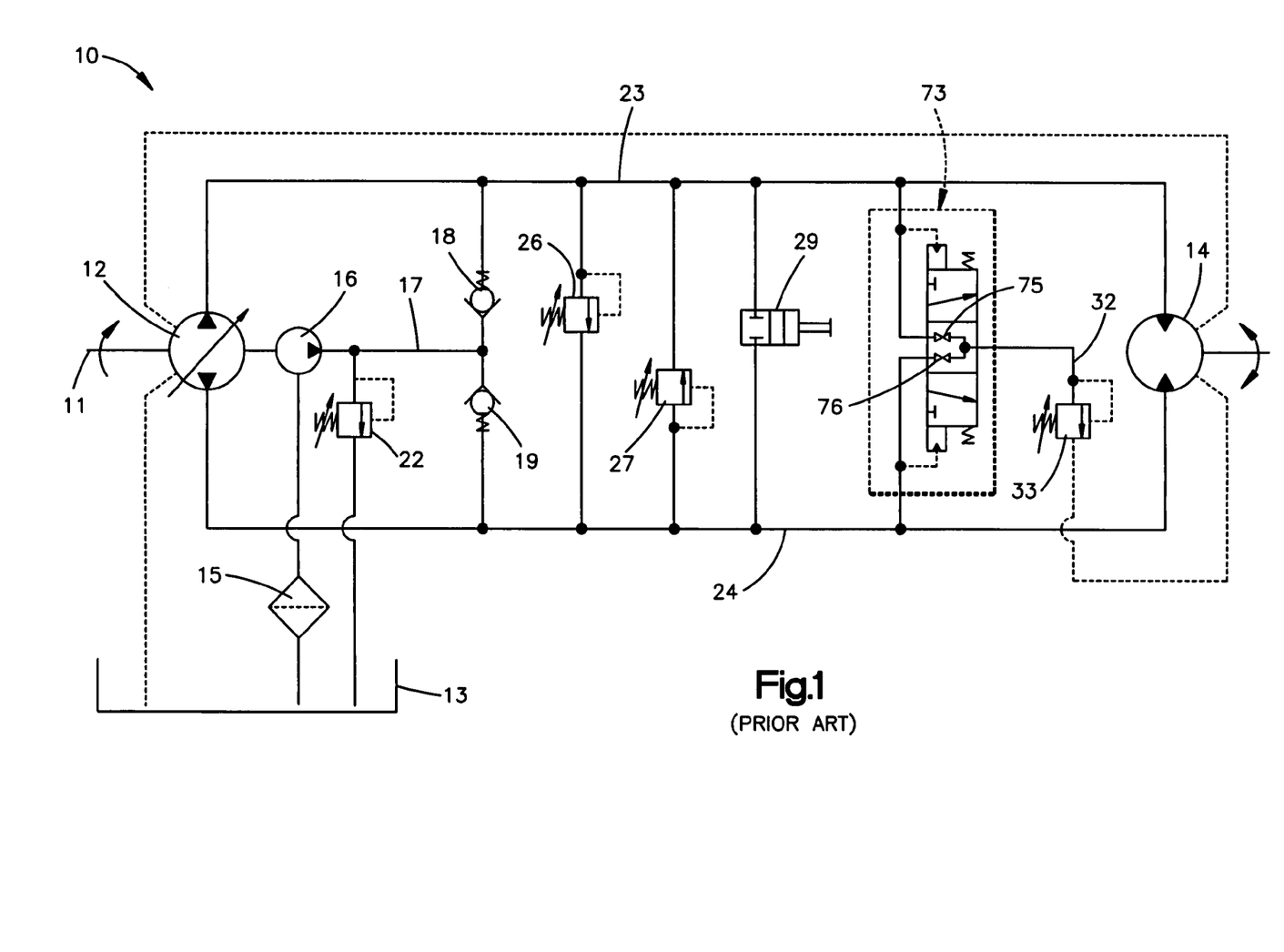
FIG. 1 is a hydraulic schematic of a typical prior art hydrostatic transmission closed loop circuit, similar to that of FIG. 9 of U.S. Pat. No. 6,837,047 B2.

Referring first to the several prior art drawings, FIG. 1 shows a schematic diagram of a typical prior art hydrostatic transmission closed-loop circuit or loop 10, similar to that of FIG. 9 of U.S. Pat. No. 6,837,047 B2, consisting of a variable displacement main radial piston pump 12 and a hydraulic motor 14, such as a fixed displacement motor, connected to each other by lines 23 and 24 of circuit 10. Pump 12 can be an over-center axial piston pump or a bent-axis piston pump. With an over-center variable displacement axial piston pump, the displacement of the pump is determined by the size and number of pistons, as well as the stroke length. An input shaft 11 for pump 12 is driven by a prime mover (not shown), such as an internal combustion engine or an electrical motor, at a predetermined speed, in predetermined direction. Although the size and number of pistons are fixed, changing the piston stroke length can change the displacement of the pump. The stroke length is determined by the angle of the swashplate of pump 12, which can be tilted by any corresponding stroke controlling device, for example a trunnion shaft (not shown). The trunnion shaft is connected to a control handle through a linkage installed in the machine. When an operator pushes the handle forward, pump 12 delivers flow for one direction of motor 14 operation. Changing the displacement of pump 12 will change its output flow rate, which controls the speed of motor 14. Moving the swashplate or yoke (not shown) of pump 12 overcenter will automatically reverse the flow out of pump 12, thus reversing the direction of motor 14. Depending upon the direction of the overcenter movement of pump swashplate or yoke, line 23 (or line 24) of circuit or loop 10 can be a high pressure supply line or a low pressure return line.

A charge pump 16, also driven via input shaft 11, supplies additional hydraulic fluid to closed-loop circuit 10 at the rate of approximately 10-30% of the flow rate that main pump 12 can deliver. Charge pump 16 draws fluid from a reservoir 13 which can be passed through a filter 15 and supplies this fluid into closed-loop circuit 10 through a conduit line 17 by way of one-way check valves 18 and 19 to compensate for any possible flow loss due to internal leakage. A charge pump relief valve 22 is used to provide a relief path to reservoir 13 when more than the required flow from charge pump 16 cannot enter closed loop circuit 10, and also regulates the pressure of the low pressure side of circuit 10. Relief valves 26 and 27 are positioned between lines 23 and 24 and protect each line from pressure overload during operation. Valve 26 provides relief for line 23 and valve 27 provides relief for line 24.

In certain applications, closed-loop circuit 10 will also have a bypass valve 29 positioned between lines 23 and 24 in order to transfer oil from one line to the other. The use of bypass valve 29 will enable motor 14 to turn over with little resistance when it is desirable, for example, to move a machine for a short distance without operating the transmission. Again, in certain applications, a hot oil shuttle valve 73 is provided to reduce loop temperature by connecting the low pressure side of closed-loop circuit 10 to a drain line. This valve allows a certain percentage of the hot oil being discharged from motor 14 to flow back to reservoir 13 for cooling and filtering, and replaces the discharged hot oil with cooled, filtered oil from charge pump 16. Line 32 connects a forward/reverse charge pressure relief valve 33 with hot oil shuttle valve 73 to provide a lower resistance on the low pressure side of closed-loop circuit 10. Relief valve 33 maintains a certain amount of fluid pressure on the low pressure side of closed-loop circuit 10. Since charge pump relief valve 22 is in parallel with relief valve 33, charge pump relief valve 22 should be set at a pressure higher than that of relief valve 33. When the transmission is in neutral and hot oil shuttle valve 73 is centered, charge pump flow is relieved over relief valve 22.

Figure 2:
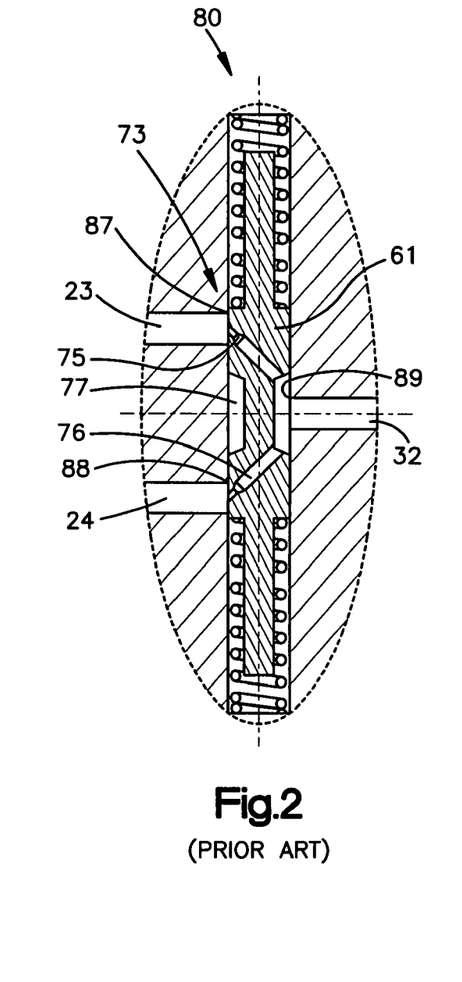
FIG. 2 is an elliptical cross-sectional view of the actual design of the hot oil shuttle valve schematically illustrated in prior art FIG. 1, showing the hot oil shuttle valve with integrated orifices and springs on both ends of the valve in a neutral position.

As best seen in prior art FIG. 2, prior art hot oil shuttle valve 73 utilizes both lines 23 and 24 for inlet flows while line 32 comprises the single outlet conduit, or exhaust line, connected with relief valve 33. Lines 23 and 24 are connected to inlet ports 87 and 88, respectively, in the valve body, while line 32 is connected to an outlet port 89 in the valve body. Position 80 shows the actual construction and orientation of valve 73 during low fluid flow from charge pump 16 when the fluid pressures in lines 23 and 24 are approximately equal. Valve spool 61 is centered so that the receiving or inlet ends of orifices 75 and 76 are substantially aligned with lines 23 and 24, respectively.

Figure 2A:
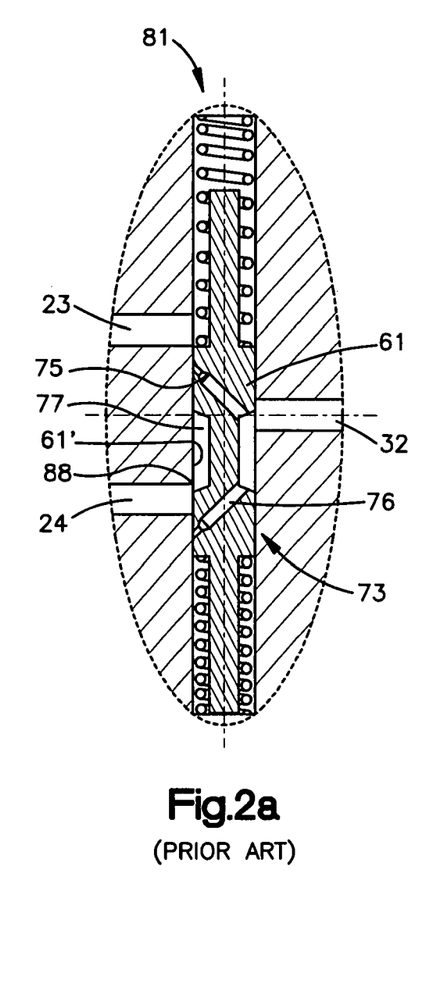
FIG. 2a is a view, similar to that of FIG. 2, but showing the position of the prior art shuttle valve when the fluid pressure in line 23 is greater than the fluid pressure in line 24.

Referring now to prior art FIG. 2a, when the operator activates the stroke controlling device in one direction in order to initiate turning of motor 14, main pump 12 will pump fluid into the corresponding side of the loop, either line 23 or 24. When the increased fluid pressure reaches a predetermined or set value sufficient to turn motor 14, valve 73 will shift as shown in non-neutral position 81, so that orifices 75 and 76 are disabled, or shut-off in a juxtaposed position against the wall of valve bore 61', and fluid can flow through low pressure line 24. Charge pump 16 then continuously charges the closed-loop on the low pressure side through line 24. Fluid flowing through low pressure line 24 ensures that cavitation does not occur in the hydrostatic transmission system. The distance from the inlet end of orifice 76 to a mid-portion 77 in valve 73 is substantially the same as the diameter of port 88. Therefore, there is no interruption of fluid flow from line 24 when valve 73 shifts in this direction. Fluid will flow from line 24 to orifice 76, then to mid-portion 77 during this transition.

Figure 2B:
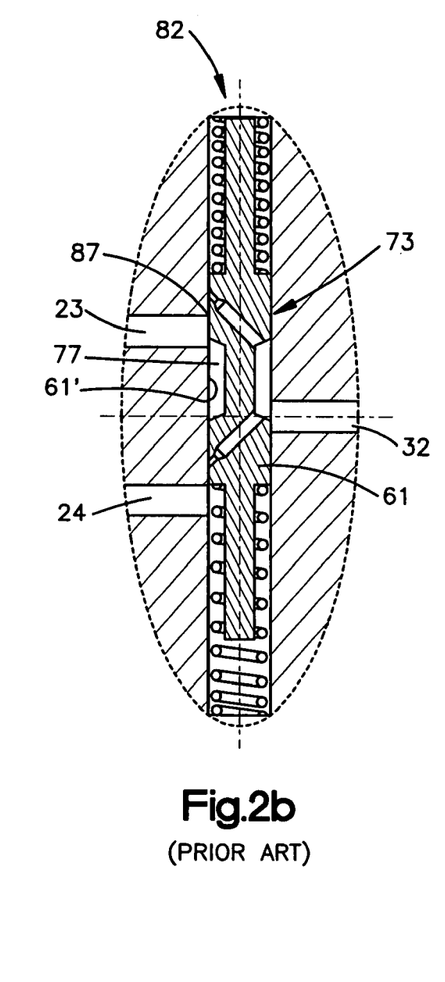
FIG. 2b is a view, similar to that of FIG. 2, but showing the position of the prior art shuttle valve when the fluid pressure in line 24 is greater than the fluid pressure in line 23.

Turning now to prior art FIG. 2b, when the operator changes the direction of movement of the control handle, main pump 12 will alter the direction of the fluid flow. When the pressure differential between lines 23 and 24 reaches a predetermined value, valve 73 will move to position 82. In position 82, the fluid pressure in line 24 is greater than the fluid pressure in line 23, thus biasing spool 61 towards low pressure line 23. As in position 81 (FIG. 2a), both orifices 75 and 76 are disabled in juxtaposed position against valve bore 61' and pressurized fluid can only reach line 32 through low pressure line 23. The distance from the inlet end of orifice 75 to mid-portion 77 in valve 73 is substantially the same as the diameter of port 87. Therefore, there is no interruption of fluid flow from line 23 when valve 73 shifts in this direction. Fluid will flow from line 23 to orifice 75, then to mid-portion 77 during this transition.

In recapitulation, when the transmission is in operation, hot oil shuttle valve 73 senses which leg 23 or 24 of circuit or loop 10 is at high pressure and shifts to expose relief valve 33 to the low pressure side of loop 10. Charge pump relief valve 22 is now in parallel with relief valve 33 which is set to relieve hydraulic pressure at a lower setting than charge pump relief valve 22 so that valve 22 does not open. Hot, contaminated hydraulic working fluid exits from the outlet of hydraulic motor 14 via hot oil shuttle valve 73 and across relief valve 33 with the hot, contaminated hydraulic fluid going back to reservoir 13 through the case of main pump 12, either through the case of hydraulic motor 14, as shown, or directly into the case of main pump 12, bypassing hydraulic motor 14. Relief valves 33 and 22 can take the form of either relief valves or orifices (not shown per se). The full flow of cool, filtered hydraulic working fluid provided by charge pump 16 enters loop 10 since it cannot exit across relief valve 22. A volume of hot, hydraulic working fluid, equal to the flow of charge pump 16, exits loop 10 across hot oil shuttle valve 73 and relief valve 33. When main pump 13 is centered, so as to provide no flow of hydraulic working fluid, and stops the rotation of hydraulic motor 14, there is no pressure differential across hot oil shuttle valve 73 and it centers. Relief valve 33 is now out of circuit 10 and the flow from charge pump 16 exits across charge pump relief valve 22 at a higher pressure than the pressure that was experienced when relief valve 33 controlled the pressure from charge pump 16. This noted higher pressure builds heat and inefficiency within circuit 10.

As described in previously noted prior art U.S. Pat. No. 6,837,047 B2, when it is desired to stop rotation of hydraulic motor 14, the swashplate of main pump 12 is centered by the operator. If it does not center exactly and is at a slight unintended angle, pressure will build up in one of the legs 23 or 24 of circuit 10, thus causing hydraulic motor 14 to slowly rotate and the machine to creep. Orifices 75 or 76 are designed to allow the transfer of a small amount of hydraulic working fluid from leg 23 or 24 to the opposite leg, thus equalizing the pressure across hydraulic motor 14 and eliminating its tendency to slowly rotate.

Figure 3:
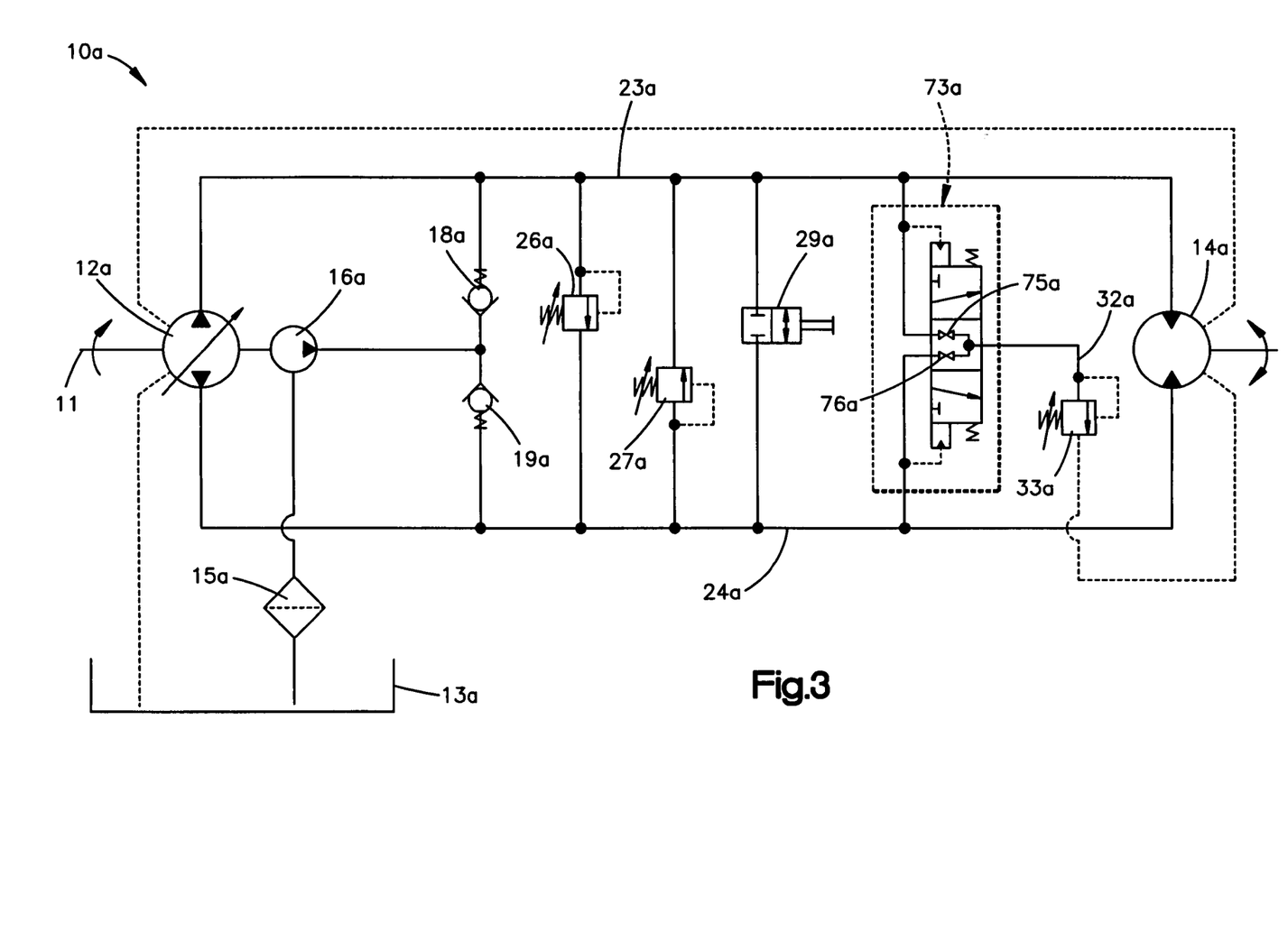
FIG. 3 is a hydraulic schematic of the present invention showing a hydrostatic transmission closed loop circuit, without the charge pump relief valve of FIG. 1, together with a modified hot oil shuttle valve.

Proceeding now to FIG. 3, illustrated therein is a hydraulic schematic diagram of the present invention, showing a hydrostatic transmission closed loop circuit 10a, without the charge pump relief valve 22 of previously-described prior art closed loop circuit 10 of FIG. 1. In addition, hot oil shuttle valve 73a is modified in a manner to be described hereinafter. The schematic diagram of FIG. 3 is quite similar to that of prior art FIG. 1 and like parts are identified with like numerals with the addition of the suffix "a". Specifically, as noted, prior art charge pump relief valve 22 is eliminated and, very importantly, hot oil shuttle valve 73a is modified by increasing the sizes of orifices 75a, 76a, to allow the passage of substantially the full flow of charge pump 16a, at a low pressure drop, i.e., at a low restriction to flow through orifices 75a, 76a. These orifices need only to be large enough to permit equalization of the fluid pressures between circuit legs 23 and 24. The only fluid that needs to be passed is the fluid that is produced by any undesired slight inclination angle of the swashplate when the pump is placed in its neutral position by the operator. The noted orifice modification exposes both legs 23a, 24a of loop 10a to low pressure relief valve 33a when main pump 12a is substantially centered to stop the rotation of hydraulic motor 14a. The benefits of new circuit 10a include the elimination of the cost of the previously-required prior art charge pump relief valve 22 and allows lower hydraulic working fluid pressure, via charge pump 16a, when main pump 12a is centered and hydraulic motor 14a is at rest. The result is a less costly and more efficient transmission that also operates at a lower working temperature.

In terms of operation, hydrostatic transmission circuit 10a, except as noted directly above, operates very similar to that of previously-described prior art circuit 10.

Figure 4:
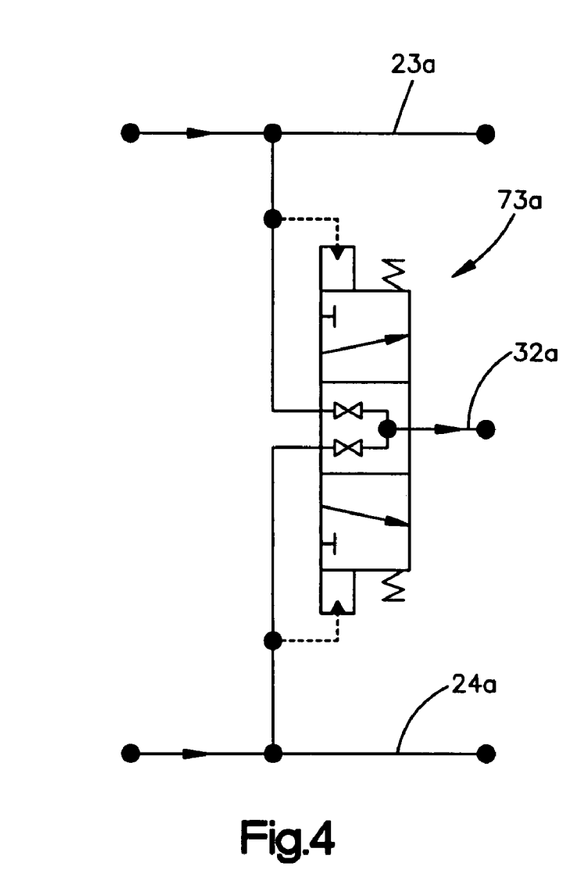
FIG. 4 is a schematic of the hot oil shuttle valve in the circuit of FIG. 2.
Figure 5:
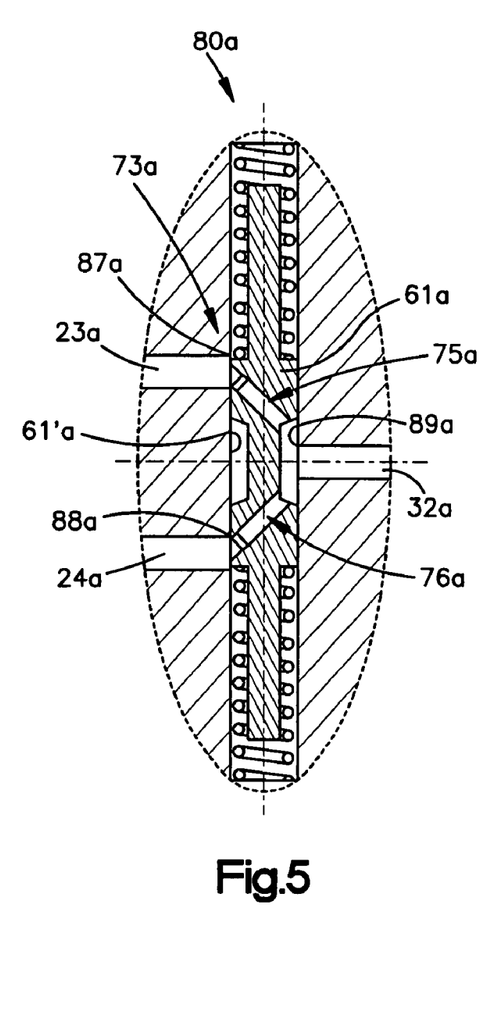
FIG. 5 is a view, similar to that of FIG. 2, showing the hot oil shuttle valve of this invention with modified integrated orifices in a neutral position.

FIG. 4 is basically a schematic diagram of hot oil shuttle valve 73a, showing both lines 23a and 24a for inlet flows while line 32a comprises the single outlet or exhaust line. Similarly, FIG. 5 is similar to that of prior art FIG. 2 in showing hot oil shuttle valve 73a in physical position 80a during low working fluid flow from charge pump 16a (not shown here) when the fluid pressures in lines 23a and 24a are approximately equal. Valve spool 61a is substantially centered so that the receiving inlet ends of orifices 75a and 76a are substantially aligned with inlet lines 23a and 24a, respectively.

Figure 5A:
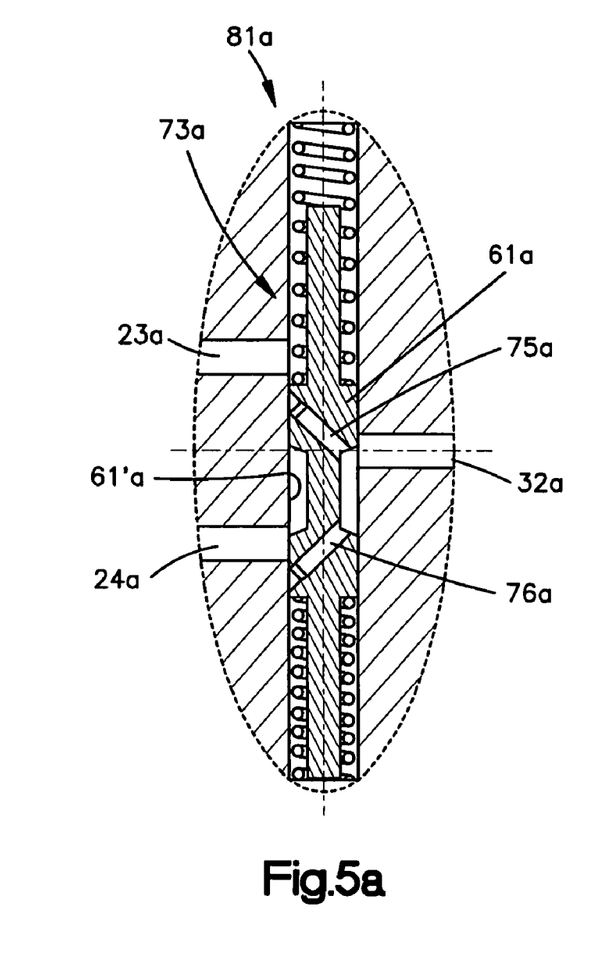

Turning now to FIG. 5a, which is similar to that of prior art FIG. 2a, shows hot oil shuttle valve 73a in non-neutral physical position 81a, wherein both orifices 75a and 76a are disabled or shut-off in a juxtaposed position against the wall of valve bore 61'a and fluid in low pressure line 24a can only reach line 32a through valve spool 61a.

Figure 5B:
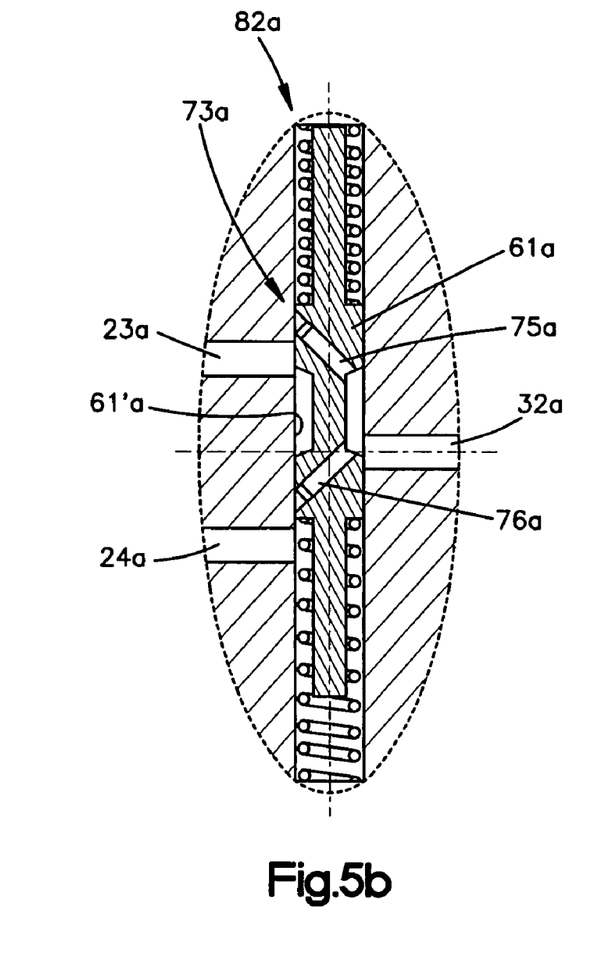

Finally, turning to FIG. 5b, which is similar to that of prior art FIG. 2b, shows hot oil shuttle valve 73a in position 82a, wherein the working fluid pressure in line 24a is greater than the working fluid pressure in line 23a, thus biasing spool 61a towards low pressure line 23a. As is the case in position 81a (FIG. 5a), both orifices 75a and 76a are disabled in juxtaposed position against valve bore 61'a and fluid in low pressure line 23a can only reach line 32a through valve spool 61a.

At this point it should be well understood that in circuit 10a, prior art charge pump relief valve 22 is eliminated and hot oil shuttle valve 73a is modified, by increasing the sizes of orifices 75a, 76a to allow the passage of substantially the full flow of charge pump 16a, at a low pressure drop. Thus, both legs 23a and 24a of loop 10a are exposed to low pressure relief valve 33a when main pump 12a is centered to stop the rotation of hydraulic motor 14. The result is a less expensive but more efficient transmission.

It is deemed that one of ordinary skill in the art will readily recognize that the present invention fills remaining needs in this art and will be able to affect various changes, substitutions of equivalents and various other aspects of the invention as described herein. Thus, it is intended that the protection granted hereon be limited only by the scope of the appended claims and their equivalents.

What is claimed is:

1. A hydraulic system comprising:
   (a) a variable displacement main pump;
   (b) a hydraulic motor;
   (c) a closed loop hydraulic circuit, including first and second leg portions, operatively interconnecting said main pump and motor;
   (d) a pair of one-way check valves positioned between the first and second leg portions of the circuit;
   (e) a charge pump within said circuit, having a single outlet line connected to said circuit, said charge pump providing a flow of fluid into the closed loop hydraulic circuit from a reservoir within the circuit, the circuit configured such that all of the flow of fluid from the charge pump, and only the flow of fluid from the charge pump, passes through the pair of one-way check valves;
   (f) a shuttle valve having a neutral position in which first and second orifices of said shuttle valve are in fluid communication with said first and second leg portions respectively, said first and second orifices providing fluid flow to said low pressure relief valve when said shuttle valve is in the neutral position, said first and second orifices being sized so as to allow substantially a full flow of said charge pump to said low pressure relief valve when said shuttle valve is in the neutral position; and
   (g) wherein all of the fluid flow from the shuttle valve is directed to the low pressure relief valve.

2. The hydraulic system of claim 1 further including a first pressure relief valve operable to provide high pressure fluid from said first leg portion to said second leg portion, a second pressure relief valve operable to provide high pressure fluid from said second leg portion to said first leg portion, wherein said low pressure relief valve is set to relieve hydraulic pressure at a lower pressure setting than said first and second pressure relief valves.

3. The hydraulic system of claim 1, wherein said shuttle valve includes first and second bypass orifices having flow areas sufficient in size to permit equalization of the fluid pressure between said low and high pressure leg portions of said circuit.

4. The hydraulic system of claim 1, wherein said the valve block functions as a hot oil shuttle valve.

* * * * *